United States Patent [19]

Morris-Sherwood et al.

[11] Patent Number: 4,552,686

[45] Date of Patent: Nov. 12, 1985

[54] CORROSION INHIBITING COMPOSITION AND METHOD

[75] Inventors: Betty J. Morris-Sherwood; Edward C. Brink, Jr., both of Port Arthur, Tex.

[73] Assignee: Texaco Inc., White Plains, N.Y.

[21] Appl. No.: 597,992

[22] Filed: Apr. 9, 1984

[51] Int. Cl.$^4$ ............................................... C09K 3/00
[52] U.S. Cl. ................................... 252/392; 252/394; 252/396; 422/16
[58] Field of Search .................. 252/392, 394, 396; 422/16, 18

[56] References Cited

U.S. PATENT DOCUMENTS

| | | | |
|---|---|---|---|
| 3,418,218 | 12/1968 | Levy | 252/396 |
| 3,424,681 | 1/1969 | Stamford | 252/396 |
| 3,928,219 | 12/1975 | Papay et al. | 252/392 |
| 3,931,029 | 1/1976 | Dutton et al. | 252/396 |
| 4,263,167 | 4/1981 | Mago | 252/392 |
| 4,277,366 | 7/1981 | Mago | 252/392 |
| 4,450,088 | 5/1984 | Wilson et al. | 252/392 |
| 4,452,758 | 6/1984 | Wilson et al. | 252/392 |

OTHER PUBLICATIONS

I. A. Manedov et al., in Azerb Khim. zh. 1977 (6) 49–50 (Russ), Chemical Abstract 89:63203b (1978).

*Primary Examiner*—Paul Lieberman
*Assistant Examiner*—Willie J. Thompson
*Attorney, Agent, or Firm*—Jack H. Park; Kenneth R. Priem; Richard A. Morgan

[57] ABSTRACT

A composition which is noncorroding to metals in contact therewith includes water, an alkylene glycol and/or a polyoxyalkylene glycol, a polyoxyalkylene amine and substantially no inorganic nitrite. The polyoxyalkylene amine replaces the previously used inorganic nitrite to reduce the toxicity of the noncorroding composition.

13 Claims, No Drawings

CORROSION INHIBITING COMPOSITION AND METHOD

BACKGROUND OF THE INVENTION

This invention relates to a corrosion inhibiting composition and method and more particularly, to the use of a polyoxyalkylene amine for such inhibition.

Aqueous systems have been preferred for many applications which are subject to high heat or sparks. Such applications included hydraulic fluids for use in systems involving a high risk of fire, and quenchants used to cool heated metals during various metal working processes where the hot metals can ignite hydrocarbon based quenchants. However aqueous systems are corrosive towards metal particularly ferrous metals. One type of aqueous system presently in use comprises water, an alkylene and/or a polyoxyalkylene glycol and one or more other additives to impart corrosion inhibition to the system. Such aqueous systems can be used as quenching mediums for heat treating metal and for hydraulic fluids.

In a previously used aqueous system, which is noncorroding to metals, an inorganic nitrite, such as sodium nitrite, was used to impart improved corrosion inhibition to the aqueous alkylene glycol system. However, nitrites are somewhat toxic and in recent years there is a movement towards the removal of nitrites and their replacement with other materials to impart corrosion inhibition to the aqueous system.

A further problem with the previously used aqueous systems is their tendency to foam on the introduction of air or other gases into the system and the lack of corrosion inhibition in the air or gas space above the aqueous systems which is subject to corrosion.

U.S. Pat. No. 3,928,219 sets forth the use of lubricating oil compositions containing tetrapoly(oxyethylene) poly(oxypropylene) derivatives of ethylene diamine having molecular weights in the range from about 1650 to 15,000. The patent states that these lubricating oil compositions exhibit improved rust inhibition properties as well as sludge elimination.

U.S. Pat. No. 3,235,501 sets forth the inhibition of foaming in oil compositions containing materials which normally tend to promote foaming of the composition. The additives comprise a small amount of a polyalkyl oxylated aliphatic amine.

In an article by E. Ludosan et al in Rev. Coroz. 1972, 2(1), 39–44 (Rom), Chemical Abstracts 19315p (1973), the use of poly(ethoxyamines) is set forth as inhibiting the corrosion of steel in HCl or $H_2SO_4$ solutions.

I. A. Mamedov et al in Azerb. Khim. Zh. 1977, (6), 49–50 (Russ), Chemicals Abstracts 89: 63203b (1978) sets forth the corrosion inhibition of steel by polyoxyethyleneamines under conditions encountered by steel equipment in crude oil extractions. The use of these amines broadened the range of corrosion inhibitors for steel in the electrolyte-hydrocarbon systems.

U.S. Pat. No. 3,235,501 sets forth the use of other amines containing a hydrophobic group of at least six carbon atoms.

SUMMARY OF THE INVENTION

It has now been discovered that the inorganic nitrite previously used in a corrosion inhibited composition comprising water and an alkylene glycol and/or polyoxyalkylene glycol can be replaced with a class of polyoxyalkylene amines. Further, such polyoxyalkylene amines not only impart corrosion inhibition to the liquid in contact with the metal but also impart corrosion inhibition to the metal in contact with the vapors of the aqueous composition. Aqueous compositions containing the glycol and the polyoxyalkylene amine also exhibit a low foaming tendency while previous additives has to be added to many corrosion inhibited compositions to reduce the foaming of such compositions which foaming is generally detrimental to the functioning of the fluid.

PREFERRED EMBODIMENTS OF THE INVENTION

The corrosion inhibited composition of the present invention preferably comprises an effective amount of an alkylene glycol and/or a polyoxyalkylene glycol, water, and an effective quantity of one or more of the preferred polyoxyalkylene amine and substantially no inorganic nitrite. Such a composition is noncorroding to metals, in generally nontoxic due to the absence of nitrites, is low foaming and can also inhibit the corrosion of metals in contact with the vapors of the composition.

The composition preferably comprises at least about 5 percent by weight of the glycol, at least about 0.2 percent by weight of the polyoxyalkylene amine with the remainder being water. Other minor quantities of additives can also be used to achieve desired results for specific applications of the composition of the present invention.

The glycol and/or polyoxyalkylene glycol can comprise from about 5 to about 90 percent by weight of the composition and more preferably from about 40 to 70 percent by weight of the composition. One preferred glycol comprises an alkylene glycol wherein the alkylene group has from 1 to about 5 carbon atoms. Examples of such glycols are ethylene, propylene, butylene and pentylene glycols. Water soluble polyoxyalkylene glycols suitable for the present invention are known compounds and are viscous liquids of high molecular weight ranging from about 600 to well over 100,000 and of high viscosity, for example, 100,000 SUS at 100° F. One preferred group of polyalkylene glycols are polymers formed of oxyalkylenes such as oxyethylene and higher oxyalkylene groups such as oxypropylene and oxybutylene. Such polymers are liquids at ordinary room temperature and are generally mixable with water at ordinary temperatures. The most preferred polyalkylene glycols are polymers formed from oxyethylene and oxypropylene having a ratio of about 50/50 to about 90/10 by weight and having a molecular weight ranging from about 2,000 to 20,000. These polyalkylene glycols may be made in a known manner by reacting a mixture of oxyethylene and oxypropylene or higher oxyalkylene in the weight ratio of from about 50/50 to about 90/10 with a compound having at least 1 active hydrogen atom and up to as many as 6 such active hydrogen atoms. Suitable compounds are water, monohydric alcohol, dihydric alcohols, trihydric alcohols, and polyhydric alcohols.

The polyoxyalkylene amines useful in the composition of the present invention are comprised of 3 portions, an aliphatic portion generally at one end of the molecule either branched or straight chained having one or more carbon atoms but most preferably less than 6 carbon atoms, a repeating unit of either oxyethylene(ethylene oxide) and/or oxypropylene(propylene oxide) and an amine function generally at the end opposite from the aliphatic function. Diamines generally have an amine function at both ends of the molecule while in triamines and higher the amine function is at various portions of the molecule. Monoamines are presently preferred. Generally, the polyoxyalkylene amine useful in the composition of the present invention is formed by reacting an aliphatic alcohol either straight chain or a polyhydric alcohol with oxyethylene and/or oxypropylene to form the polymer. The oxyethylene and oxypropylene are preferably in the weight ratio of between about 4:1 and about 25:1; most preferably between about 5:1 and about 20:1. The resulting polymers are then reacted with ammonia and hydrogen under catalytic conditions to produce the desired amine. The properties of the amine depend upon the number of carbon atoms in the alcohol used to form the amine and the number of oxyethylene and/or oxypropylene units used.

The molecular weight of the polyoxyalkylene amine can vary from about 200 or less to several thousand. The preferred polyoxyalkalene amine can have a molecular weight between about 300 and about 3,000, most preferably between about 700 and about 1500. The amine can be primary, secondary or tertiary, if polyhydric alcohols are used the resulting amine can have multiple amine groups. The preferred primary polyoxyalkylene amine has the following formula:

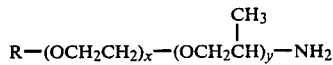

In the above formula, R comprises a methyl or an alkyl group. The number of oxyethylene and oxypropylene repeating units in the polymer is represented by x and y. In preferred amines x can be between 1 and about 50 and y can be between 1 and about 5. In the presently preferred polyoxyalkylene amines, R can comprise a methyl group with $x=10$ and $y=2$ (molecular weight about 600), or $x=18-19$ and $y=2-3$ (molecular weight about 1,000), or $x=32$ and $y=2$ (molecular weight about 1,500), or $x=41$ and $y=3$ (molecular weight about 2,000), R can also comprise a linear alkyl group of 4 carbon atoms with $x=9$ and $y=2$ (molecular weight about 600).

It is to be understood that these are presently the most preferred and other similar polyoxyalkylene amines of similar structure and of similar molecular weight are also within the scope of the present invention.

The polyoxyalkylene amine can comprise from about 0.1 to about 15 percent by weight of the composition. Preferably, the polyoxyalkylene amine comprises from about 0.3 to about 10 percent by weight of the composition with about 0.5 being presently most preferred. Water, the other major component of the composition, can comprise upwards of 60 percent by weight. Water preferably comprises from about 10 to 35 or about 10 to 25 percent by weight of the composition.

The present invention not only includes the above composition containing substantially no inorganic nitrites but also includes a method of preventing the corrosion of metals in contact with aqueous systems and simultaneously eliminating the presence of toxic inorganic nitrites in such corrosion inhibited aqueous systems. The method of the present invention comprises reducing the nitrite content of an aqueous composition comprising water, alkylene glycol and/or polyalkylene glycol by the step of replacing the inorganic nitrite with a polyoxyalkylene amine.

The composition and method of the present invention will be better understood from the following examples which are merely illustrative and not meant to limit the invention in any way. All percentages unless otherwise indicated, are percentages by weight.

EXAMPLE I

A corrosion-inhibited composition which is useful as a hydraulic safety fluid was formed by combining about 30 percent by weight water, about 42.5 weight percent ethylene glycol, about 27 percent by weight of an aqueous polyalkylene glycol which was formed of 75 percent oxyethylene groups and 25 percent oxypropylene groups by weight (which aqueous polyalkylene glycol comprised about 67 percent by weight of the polymer and about 33 percent by weight water) and about 0.5 percent by weight of a polyoxyalkylene amine having the following approximate formula:

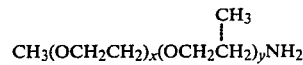

Where x is a number between about 18 and 19, most preferably about 18.6 and y is a number between about 2 and 3, most preferably about 2.6. The values for x and y are not exact since the amine is a mixture of compounds and the preferred average value of x and y are set forth above. The composition also comprised about 0.35 percent by weight of an alkali hydroxide here potassium hydroxide, about 0.05 weight percent tetrasodium EDTA and about 1 percent by weight pelargonic acid.

The corrosion inhibiting properties of this composition was compared to that of a commercially available hydraulic safety fluid which has approximately the same concentration of ingredients with the exception that the polyoxyalkylene was replaced with sodium nitrite and a quaternary ammonium inhibitor. Both fluid compositions exhibited the same low corrosion properties desired of these hydraulic fluids and they passed all corrosion tests.

One of the corrosion tests passed by both the prior art composition and the composition of the present invention wherein the sodium nitrite was replaced with the polyoxyalkylene amine was a Modified ASTM D665 Rust Test. In this modified test a cylinderical steel specimen was polished by successive grinding with 150 and 240 grit aluminum oxide abrasive cloth. The steel specimen was inserted in a rubber stopper equipped with a hole. Sufficient quantity of the fluid composition to be tested was charged to a flask such that when the specimen was in place in the flask, approximately one-half of the specimen was immersed. The flask, test solution and specimen were placed in an oil bath maintained at a temperature of about 140° F. (55.5° C.). The portion of the steel specimen subjected to vapor and the portion subjected to the liquid portion of the fluid were rated after the first hour for evidence of rusting and again after completion of the first 24 hour test period. The rating system used was similar to that defined by MIL-L-24467. This rating system defined no rust as being no rust visible on the specimen. Trace rust as being 1-6 rust specks of no more than 1 millimeter in diameter, light rust as being 7-12 rust specks, moderate rust was an overall light rust, and heavy rust was an overall heavy rust or heavy rust spots.

A Vapor Corrosion Reflux Test which was based on MIL-L-24467 (ships) testing procedure for vapor corrosions was conducted on both the composition of the present invention and on the prior art composition. In this test two mild carbon steel specimens were polished, one was then suspended above a flask containing about 50 milliliters of the composition as above and one above a flask containing the prior art composition. The composition were then heated in an oil bath for 48 hours at 180° F. (82° C.). The specimens were then rated as per the previous paragraph for rust. Again, the composition of the present invention and the prior art composition exhibited the same low corrosion and passed the test.

The composition of the present invention was tested for foaming according to Test Method ASTM D 892 Sequences I, II and III. In the Sequence I Test approximately 200 milliliters of sample were decanted into a beaker and were heated to about 49° C. and then allowed to cool to about 24° C. The cooled sample was then poured into a 1000 milliliter cylinder until the liquid level was at the 190 milliliter mark. The cylinder was then immersed to at least the 900 milliliter mark in a bath maintained at about 24° C. A diffuser stone and air inlet tube were then inserted into the cylinder and into the sample. About 94 milliliters of air per minute were forced through the stone for about 5 minutes. At the end of the period the air flow was shut off and the total volume of foam was measured and then measured again after ten minutes of waiting.

In the Sequence II Test, a second portion of sample was poured into a 1000 milliliter cylinder until the liquid level was at the 180 milliliter mark. The cylinder was immersed into a bath maintained at a temperature of about 93.5° C. A diffuser stone was then immersed into the sample in the cylinder and the test was carried out as in the Sequence I Test.

In the Sequence III Test, any foam remaining after the Sequence II Test was collapsed, the sample was then allowed to cool to a temperature below about 43.5° C. and then further cooled to a temperature of about 24° C. A gas diffuser stone was inserted and the test was then carried out as in Sequence I and II. The composition of the present invention produced low or no foaming in all sequences. Low foaming is important for hydraulic fluids as well as for many other compositions.

EXAMPLE II

A composition which was to be used as a quenchant was made by combining about 22.6 percent by weight of water, about 76.85 percent by weight of the polyalkylene glycol of Example I and about 0.5 percent by weight of the polyoxyalkylene amine of Example I. This composition was compared with a commercially sold quenchant having less than about 5 percent by weight of sodium nitrite and no polyoxyalkylene amine. The prior art composition is set forth in U.S. Pat. No. 3,220,893.

Both the composition of the present invention and the prior art composition passed the Modified D665 Rust Test, vapor phase and liquid phase.

The above examples are for illustrative purposes and not meant to limit the invention in any way. Variations and modifications of the above are possible without going outside of the scope of the present invention which is set forth in the following claims.

What is claimed is:

1. An inorganic nitrite free composition which is noncorroding to metals in contact therewith comprising water, an effective amount of a glycol selected from the group consisting of an alkylene glycol, a polyoxyalkylene glycol, and mixtures thereof, and an effective amount of a polyoxyalkylene amine of the formula:

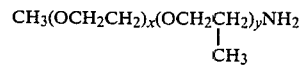

wherein x is a number between about 18 and 19, and y is a number between about 2 and 3.

2. The composition of claim 1 wherein said polyoxyalkylene amine comprises from about 0.1 to about 15 percent by weight of said composition.

3. The composition of claim 1 wherein said polyoxyalkylene glycol comprises a mixture of oxyethylene and oxypropylene in the ratio by weight of between about 50/50 and about 90/10.

4. The composition of claim 1 and further comprising at least one additive selected from the group consisting of pelargonic acid, an alkali hydroxide and tetra sodium EDTA.

5. The composition of claim 1 wherein said alkylene glycol comprises from 1 to about 5 carbon atoms.

6. The composition of claim 1 wherein said glycol comprises ethylene glycol and a polyoxyalkylene glycol comprising a glycol formed from oxyethylene and oxypropylene in a weight ratio between about 50/50 and about 90/10.

7. The composition of claim 1 wherein said water comprises from about 10 to about 25 percent by weight, said glycol comprises from about 90 to about 5 percent by weight, and wherein said polyoxyalkylene amine comprises from about 0.3 to about 10 percent by weight.

8. A method of preventing the corrosion of metals in contact with an aqueous composition and simultaneously eliminating the inorganic nitrite content thereof comprising the step of replacing the inorganic nitrite of said aqueous composition comprising water, a glycol selected from the group consisting of an alkylene glycol, a polyoxyalkylene glycol and mixtures thereof with an effective quantity of a polyoxyalkylene amine of the formula:

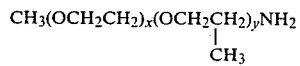

wherein x is a number between about 18 and 19, and y is a number between about 2 and 3.

9. The method of claim 8 wherein said polyoxyalkylene amine comprises from about 0.1 to about 15 percent by weight of said composition.

10. The method of claim 8 wherein said polyoxyalkylene glycol comprises a mixture of oxyethylene and oxypropylene in the ratio by weight of between about 50/50 and about 90/10.

11. The method of claim 8 and further comprising at least one additive selected from the group consisting of pelargonic acid, an alkali hydroxide and tetrasodium EDTA.

12. The method of claim 8 wherein said alkylene glycol comprises from 1 to about 5 carbon atoms.

13. The method of claim 8 wherein said water comprises about 10 to about 25 percent by weight of said composition, said glycol comprises from about 90 to about 5 percent by weight of said composition and wherein said polyoxyalkylene amine comprises from about 0.3 to about 10 percent by weight of said composition.

* * * * *